No. 657,123. Patented Sept. 4, 1900.
H. W. LIBBEY.
CAR WHEEL.
(Application filed July 27, 1899.)

(No Model.)

Witnesses:

Inventor:

UNITED STATES PATENT OFFICE.

HOSEA W. LIBBEY, OF BOSTON, MASSACHUSETTS.

CAR-WHEEL.

SPECIFICATION forming part of Letters Patent No. 657,123, dated September 4, 1900.

Application filed July 27, 1899. Serial No. 725,281. (No model.)

*To all whom it may concern:*

Be it known that I, HOSEA W. LIBBEY, a citizen of the United States, and a resident of Boston, in the county of Suffolk and State of Massachusetts, have invented certain new and useful Improvements in Car-Wheels, of which the following is a specification.

The object of my invention is to produce a car-wheel with an elastic tread, which will run noiselessly upon the rail and at the same time have a greater adhesion and less friction than car-wheels having metal treads.

The invention consists in forming a car-wheel in two parts, the rear portion being formed with a number of recesses and an elastic tread around its periphery, formed with ears or projections that fit into the recesses in the rear portion of the wheel, the front portion of the wheel forming the flange, all the parts being secured together by bolts, as hereinafter set forth.

Figure 1:
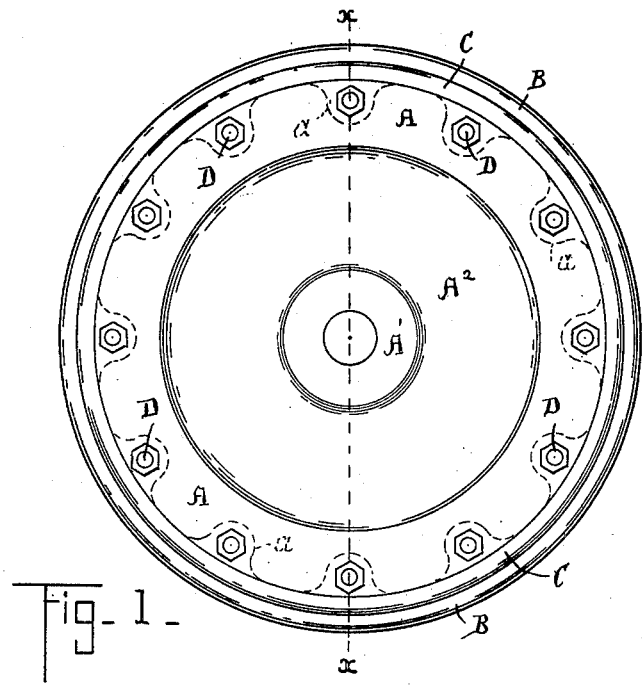
Figure 2:
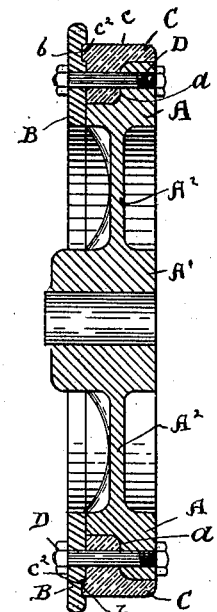
Figure 3:
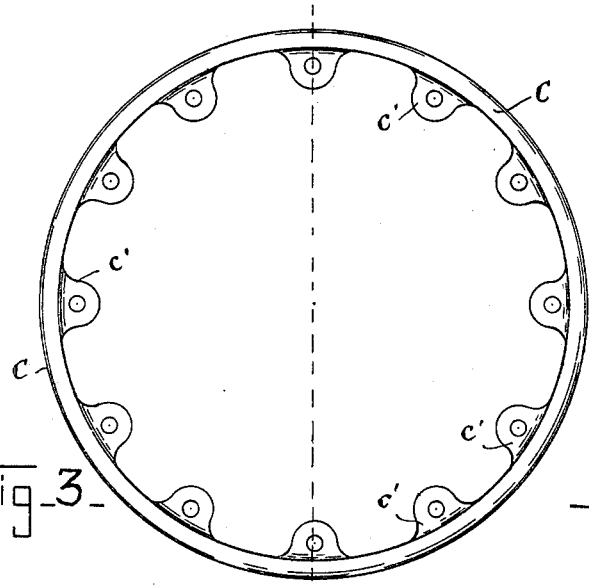
Figure 4:
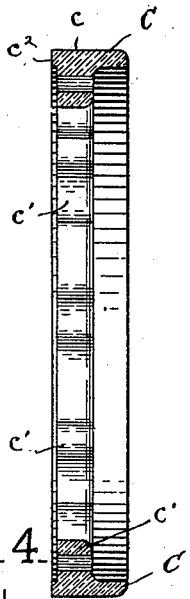

Referring to the accompanying drawings, Figure 1 represents a rear view of a car-wheel embodying my invention. Fig. 2 is a vertical section through the same, taken on line $x$ $x$ of Fig. 1. Fig. 3 is a side view of the elastic tread; and Fig. 4 is a vertical section of same, taken on line $z$ $z$ of Fig. 3.

A represents the outer rim of the rear or body portion of the wheel, which is cast in one piece with the hub $A'$ and web $A^2$. The outer periphery of the rim A is formed with a number of recesses $a$, formed in its outer face.

B represents the outer rim or flange portion of the rail and is formed with an annular recess $b$ on its rear side.

C is the elastic tread, formed, preferably, of india-rubber or its compounds and having a flat tread $c$ and at its rear or inner side formed with a number of lugs or projections $c'$ of a form to fit into the recesses $a$ in the rim A and an annular projection or ring $c^2$ to fit into the annular recess $b$ in the rim or flange B.

D D are bolts that pass through holes formed in the outer rim or flange B, the lugs or projections $c'$ of the elastic tire, and the rear or body portion A, as shown.

It will be seen that by this construction an elastic tread is held and secured by the two portions of the wheel—namely, the rear or body portion and the rim or flange portion—the whole being secured together by means of bolts passing through the various portions in the manner described.

What I claim is—

A car-wheel consisting of a body having recesses in the periphery thereof extending from one side edge of said body to a point intermediate its side edges forming a substantially smooth or cylindrical portion on one side of the periphery, and further provided with transverse openings in line with said recesses, an elastic tire having a projecting annular rib on one side and having inwardly-extending lugs corresponding in shape and position with the recesses in said body and adapted to fit within said recesses, the said lugs extending from one side edge of said tire to a point intermediate the side edges thereof and thereby forming an overlapping portion which lies against the smooth, cylindrical portion of the periphery of said body, the said lugs being further provided with transverse openings in line with the transverse openings in said body, and a flange which projects beyond the periphery of said body and tire, is provided with an annular groove in which the annular rib on said tire fits and is further provided with transverse openings in line with the transverse openings through said body and tire, the said openings in said body, tire and flange being provided for the reception of bolts for securing the several parts of the wheel together.

In testimony whereof I have affixed my signature in presence of two witnesses.

HOSEA W. LIBBEY.

Witnesses:
CHAS. STEERE,
EDWIN PLANTA.